US012643741B2

(12) United States Patent (10) Patent No.: US 12,643,741 B2

Autry et al. (45) Date of Patent: Jun. 2, 2026

(54) AUXILIARY ROLLER SYSTEM FOR USE WITH BELT-FEED SYSTEMS

(71) Applicant: Shaw Industries Group, Inc., Dalton, GA (US)

(72) Inventors: Melvin Autry, Dalton, GA (US); Jeff Sharp, Dalton, GA (US); John Shelton, Dalton, GA (US); Scotty Scott, Dalton, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 40 days.

(21) Appl. No.: 18/392,040

(22) Filed: Dec. 21, 2023

(65) Prior Publication Data

US 2024/0208733 A1     Jun. 27, 2024

Related U.S. Application Data

(60) Provisional application No. 63/476,480, filed on Dec. 21, 2022.

(51) Int. Cl.
B65G 15/16        (2006.01)
B65G 15/18        (2006.01)

(52) U.S. Cl.
CPC ............. B65G 15/16 (2013.01); B65G 15/18 (2013.01)

(58) Field of Classification Search
CPC ........ B65G 15/16; B65G 15/14; B65G 15/18; B65G 21/209
USPC ........................................ 198/626, 1, 626.6
See application file for complete search history.

(56) References Cited

U.S. PATENT DOCUMENTS

| | | | | |
|---|---|---|---|---|
| 3,262,545 A * | 7/1966 | Worsencroft | .......... | B65H 5/023 198/626.6 |
| 3,442,272 A * | 5/1969 | Bergman | ................. | G07D 9/00 198/562 |
| 3,951,257 A * | 4/1976 | Storace | .................. | B65H 5/023 198/626.6 |
| 4,438,617 A * | 3/1984 | Ulrich | .................... | B65G 23/44 198/840 |
| 5,277,295 A * | 1/1994 | Grecksch | ............... | D01H 9/001 198/465.1 |
| 5,458,051 A * | 10/1995 | Alden | .................... | B65G 23/44 198/813 |
| 5,490,666 A * | 2/1996 | Albert | .................... | B65H 29/12 270/41 |
| 5,979,307 A * | 11/1999 | Brauer | ..................... | B30B 5/06 425/371 |
| 6,264,022 B1 * | 7/2001 | Petack | .................. | B65G 15/16 198/626.4 |
| 7,334,676 B1 * | 2/2008 | McGourin | ............. | B65G 15/14 198/626.6 |

(Continued)

*Primary Examiner* — Mark A Deuble
(74) *Attorney, Agent, or Firm* — Smith Gambrell & Russell LLP

(57)        ABSTRACT

The invention is directed towards an auxiliary roller system configured to be used with a belt-feed machine. The auxiliary roller system includes an auxiliary roller connected to an arm and an adjustable mount. The adjustable mount is configured to place the auxiliary roller past a primary roller of the belt-feed machine, with the auxiliary roller configured to engage and apply force to an upper belt of the belt-feed machine used to hold down material being fed into an opening of the belt-feed machine.

20 Claims, 5 Drawing Sheets

(56) References Cited

U.S. PATENT DOCUMENTS

| | | | |
|---|---|---|---|
| 7,500,554 B2 * | 3/2009 | Schererz ................ | B65H 29/12 |
| | | | 198/817 |
| 9,039,498 B2 * | 5/2015 | Schwarz ................ | A22C 25/17 |
| | | | 452/127 |
| 2021/0269247 A1 * | 9/2021 | Wilson ................... | B65G 15/16 |

* cited by examiner

AUXILIARY ROLLER SYSTEM FOR USE WITH BELT-FEED SYSTEMS

BACKGROUND OF THE INVENTION

Various industries utilize belt systems to transport materials to and during processing of materials (e.g., fibers). One issue with such belt systems is that the materials can fall off of the belt during transportation and processing. Some industries have addressed this issue by utilizing a second belt (e.g., a counterband) located above the supporting belt to hold the material between the two belts.

However, the above systems still have some drawbacks. Material can still be lost due to moving air getting in between the counterband and belt. This is especially the case when the counterbands/belts enter into openings (i.e. heads) of various machines. In such instances, the material can be lost due to the counterband not marrying the belt quick enough upon entry into the opening. If too much material is blown off the belt, a reset of the material may be necessary, leading to a shutdown of the system.

In addition, if the material is not held down enough and is allowed to be loose, lapping around the head roller can occur, creating an obstruction. This leads to system shut downs to remove the material. In addition, such lapping can lead to head part wear, which accelerates the need to rebuild the heads of such systems. Such rebuilds may be required about every two months per head on average in current systems. Rebuilds require replacement of multiple components including but not limited to head rollers, side plates, joint kilts, and lamellas. Therefore, there is a need for a system and method to address the issues described above.

SUMMARY OF THE INVENTION

It is to be understood that this summary is not an extensive overview of the disclosure. This summary provides examples and is not restrictive and it is intended to neither identify key or critical elements of the disclosure nor delineate the scope thereof. The sole purpose of this summary is to explain and provide examples of certain concepts of the disclosure as an introduction to the following complete and extensive detailed description.

The present disclosure relates to an auxiliary roller system. Such system is configured to be used with a belt-feed machine. The system comprises an auxiliary roller, an arm connected to the auxiliary roller, and an adjustable mount connected to the arm opposite the auxiliary roller. The adjustable mount is configured to place the auxiliary roller past a primary roller of the belt-feed machine. The auxiliary roller is configured to engage and apply force to an upper belt of the belt-feed machine used to hold down material being fed into an opening of the belt-feed machine. Feed materials can be selected from a variety of feed materials known in the art including polyethylene terephthalate (PET), nylon, other synthetic fibers, yarn, and the like.

The present disclosure relates to an auxiliary roller system including one or more auxiliary roller(s). Auxiliary roller(s) include a variety of diameters depending on process requirements and are made of a variety of materials that are capable of withstanding heat and moisture. Auxiliary roller(s) include a cylindrical body and an outer surface that marries the upper belt of a belt-feed machine to a lower belt to prevent raw material being fed into the machine from being blown off or falling off the lower belt. Material being blown off of a lower belt may be referred to as leaking, air leaking, material leaking, or the like. Preventing such leaking prevents both material loss and material lapping. Material lapping refers to the separation of materials being fed into a belt-feed machine from a surface of a lower belt where the separated material wraps, or laps, around one or more of a number of components associated with the machine. A decrease in material lapping decreases the need for roller head rebuilds. By decreasing the need for rebuilds, manufacturing downtime is decreased, and overall production rates are increased. An outer surface of an auxiliary roller includes a middle channel.

The present disclosure relates to an auxiliary roller system including an axle extending through an aperture in an auxiliary roller where the aperture is configured to receive the axle. The axle extends the auxiliary roller away from an arm. In such an aspect, an auxiliary roller includes two bearings configured to rotate freely against a surface of a moving belt located beneath the roller. In such an aspect, an auxiliary roller is configured to rotate around the axle while the axle is in a fixed relationship to the arm. An auxiliary roller may be secured to an axle by fasteners that securely mount the auxiliary roller on the axle while allowing the auxiliary roller to freely rotate.

The present disclosure relates to an auxiliary roller system including one or more auxiliary rollers. In some aspects, one auxiliary roller can be used on one edge of a belt. In additional aspects, two auxiliary rollers can be used where a first auxiliary roller and a second auxiliary roller are configured to engage opposite edges across of a width of an upper belt to marry both edges of the upper belt to a surface of a lower belt.

The present disclosure relates to an auxiliary roller system including a mount. A mount includes a channel configured to receive a horizontal support to fixedly mount auxiliary roller head(s) to a horizontal support, wherein the horizontal mount is configured to attach to the opening of the belt-feed machine. In such an aspect, a mount allows auxiliary roller head(s) to be adjustably mounted at different positions in relation to the mount.

The present disclosure additionally relates to a system for feeding a material into a machine. Such system includes an opening of the machine configured to receive a feed of the material, a lower belt configured to carry and move the feed through the opening and into the machine, and an upper belt disposed above the lower belt and configured to retain the feed on the lower belt while the upper belt and the lower belt move through the machine. Such system also includes a primary roller disposed outside of the machine opening and a first auxiliary roller positioned further within the opening of the machine. The primary roller is configured to contact a width of the upper belt, which allows the upper belt to enter the opening and create the force needed to retain the feed on the lower belt. The auxiliary roller creates contact between an upper and lower belt by marrying the upper belt to the lower belt. The auxiliary roller applies an additional force to keep the feed between the upper and lower belts as they move through a machine.

The present disclosure relates to a system for feeding a material, such as PET, nylon, synthetic fibers, yarn, and the like, into a machine, further including a second auxiliary roller. In such an aspect, the first auxiliary roller and the second auxiliary roller are disposed on opposing ends of a width of an upper belt. Such configuration prevents material being fed into the machine from being blown back out of the opening, falling off of the lower belt, or causing laps on roller head components. In such aspects, both the first and second auxiliary rollers are connected to the machine through adjustable mounts. An adjustable mount is coupled to one end of an arm, as described by the present disclosure. An auxiliary roller is coupled to the other, opposing end of the arm away from the adjustable mount. Adjustable mounts allow an arm to be adjusted rotationally and transversely.

BRIEF DESCRIPTION OF DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION OF THE INVENTION

Figure 1:
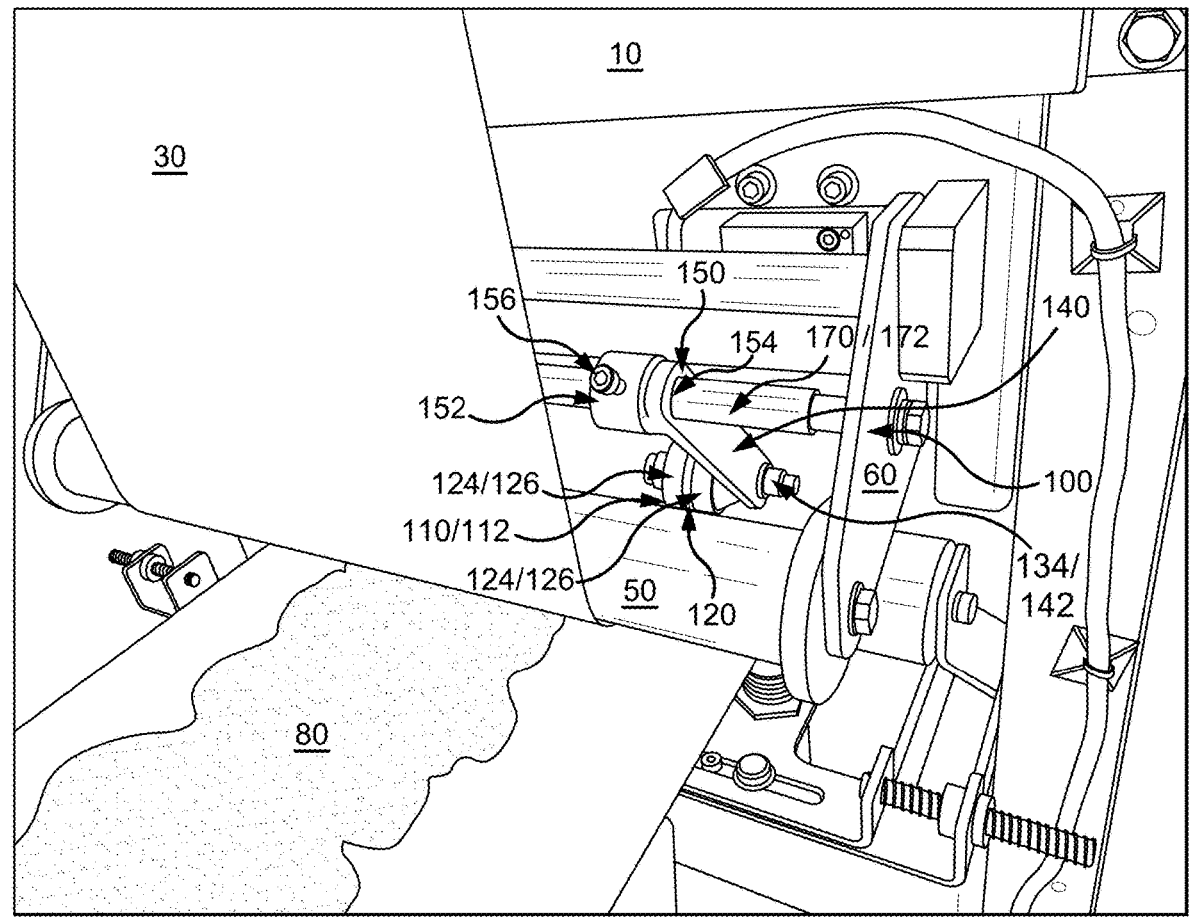
FIG. 1 illustrates an auxiliary roller system for use with a belt-feed system according to an aspect of the present disclosure.
Figure 2:
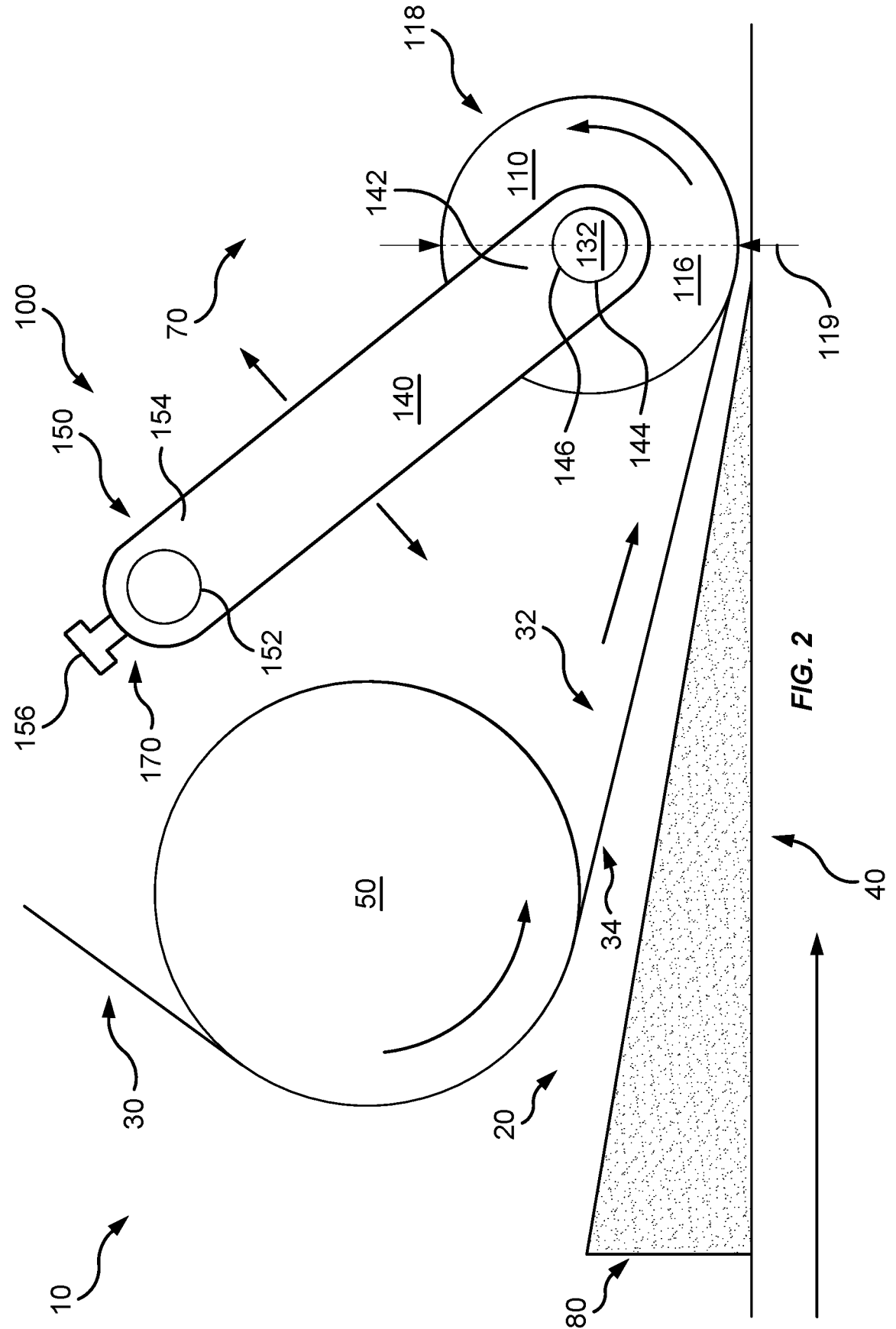
FIG. 2 is a schematic side view of components of an auxiliary roller system for use with a belt-feed system according to an aspect of the present disclosure.
Figure 3:
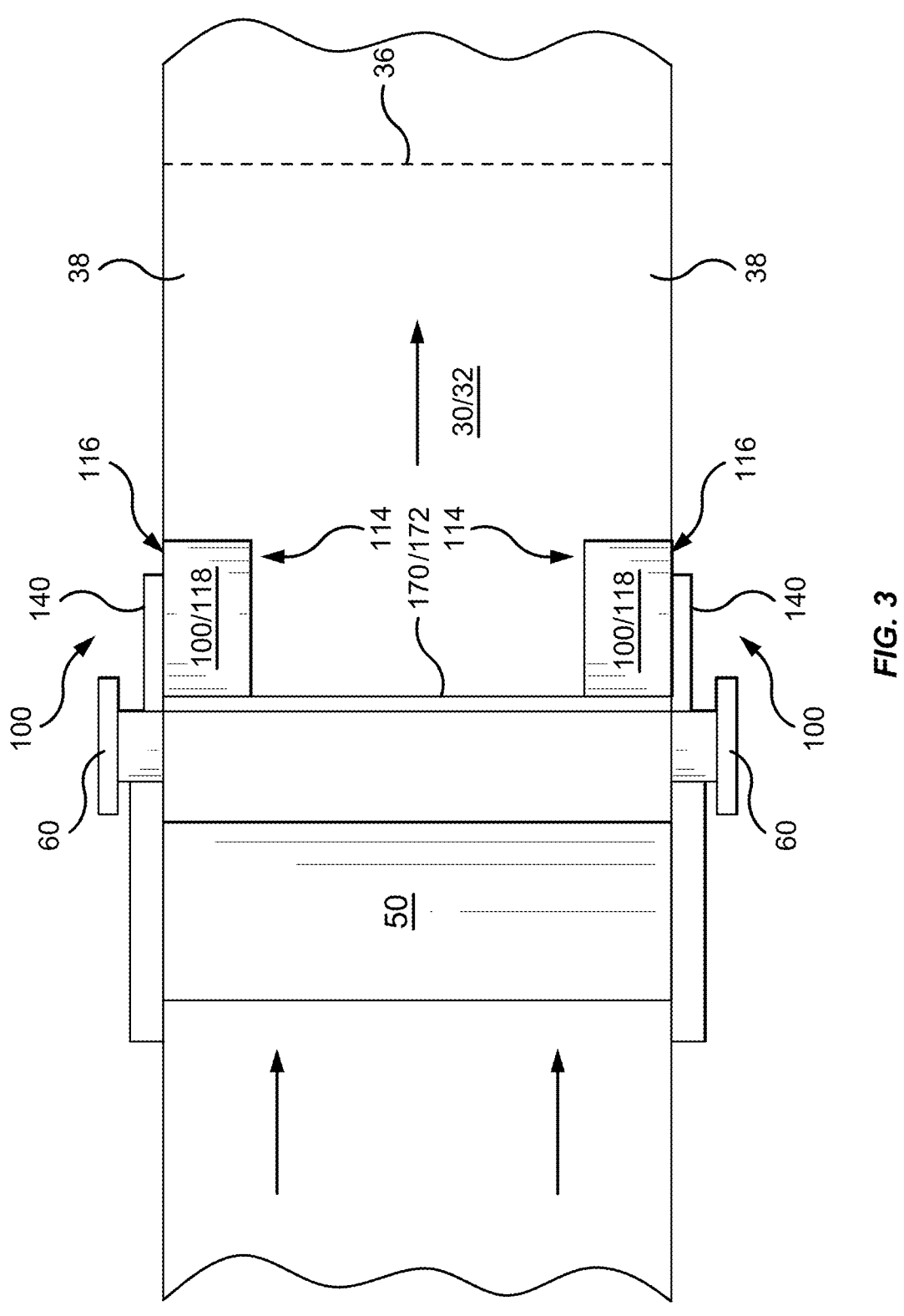
FIG. 3 is a schematic top view of components of an auxiliary roller system for use with a belt-feed system according to an aspect of the present disclosure.

It should be appreciated that this disclosure is not limited to the systems, components, and methods described herein. It is also to be understood that the terminology used herein is for the purpose of describing certain embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Any systems, components, and methods similar or equivalent to those described herein can be used in the practice or testing of the present invention. All publications mentioned are incorporated herein by reference in their entirety.

The use of the terms "a," "an," "the," and similar referents in the context of describing the presently claimed invention (especially in the context of the claims) are to be construed to cover both the singular and the plural, unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein.

Use of the term "about" is intended to describe values either above or below the stated value in a range of approx. +/−10%; in other embodiments the values may range in value either above or below the stated value in a range of approx. +/−5%; in other embodiments the values may range in value either above or below the stated value in a range of approx. +/−2%; in other embodiments the values may range in value either above or below the stated value in a range of approx. +/−1%. The preceding ranges are intended to be made clear by context, and no further limitation is implied.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The present disclosure can be understood more readily by reference to the following detailed description, examples, drawings, and claims, and their previous and following description. However, before the present systems, components, and methods are disclosed and described, it is to be understood that this disclosure is not limited to the specific systems, components, and methods disclosed unless otherwise specified, as such can, of course, vary. It is also to be understood that the terminology used herein is for the purpose of describing particular aspects only and is not intended to be limiting.

The present disclosure relates to an auxiliary roller system 100 configured to be utilized with belt-feed machine (BFM) 10, as shown in FIGS. 1-5. In such aspects, the auxiliary roller system 100 is configured to work with a primary roller 50 (e.g., a head roller), where both the auxiliary roller system 100, via auxiliary roller 110, and the primary roller 50 engages an upper belt 30 (e.g., a counterband) used to hold down various materials 80 that are advanced on a lower belt 30 through an opening/head 20 of a head guard 180 (see FIGS. 4-5) into a tunnel 70 of the BFM 10. Auxiliary roller(s) 110 of an auxiliary roller system 100 are configured to be adjustably positioned where auxiliary roller(s) 110 are disposed closer to an opening 20 or within the interior of a BFM 10 than a primary roller 50. A primary roller 50 may be disposed at or near an opening/head 20 of a BFM 10 while auxiliary roller(s) may be disposed at various positions closer to and within the tunnel 70.

An auxiliary roller system 100 allows a counterband/upper belt 30 to engage/marry a lower belt 40 at a position closer to or at an opening 20 of a BFM 10 compared to traditional machines. Marrying of the two belts at a position closer to or at an opening 20 of a BFM 10 compared to traditional methods keeps material 80 sandwiched between the two belts 30/40 as material 80 is advanced through the opening 20 and tunnel 70 of the BFM 10. These and other aspects are discussed in more detail below.

In an aspect, the auxiliary roller system 100 is configured to be used with any BFM 10 that uses an upper belt to apply downward force, such as holding something down, to materials that are being transported on a lower belt. As a non-limiting example, a BFM 10 can be a Superba tunnel that utilizes a textured stainless steel lower belt 40 with a synthetic fiber or polymeric counterband 30, including but not limited to a counterband 30 made of Nomex, to transport various materials 80 into an opening/head 20 and through a tunnel 70 of the BFM 10 for further processing, as shown in FIG. 1. Additional BFMs 10 can utilize an auxiliary roller system 100 in other aspects. A wide variety of materials 80 can be used in conjunction with the system 100 including but not limited to polyethylene terephthalate (PET), nylon, any other synthetic fibers known to one of skill in the art, cotton, cellulosics, naturally occurring fibers, and the like. In additional, non-limiting examples, other materials 80 including natural materials such as wool, yarn, or the like can also be used in the system 100. However, in other aspects, various other belt-utilizing machines can benefit from the auxiliary roller system 100 discussed below.

In an aspect, the auxiliary roller system 100 includes an auxiliary roller 110. An auxiliary roller 110 has a cylindrical body 112 with a first end 114, a second end 116, and an outer surface 118 disposed between the first end 114 and the second end 116. In an aspect, the cylindrical body 112 of the auxiliary roller 110 can be formed from two separate bearings 124, 126 held together, as shown in FIG. 1. In such aspect, bearings 124, 126 may be disposed adjacent to each other on an axle 132, discussed further herein. Disposing bearings 124, 126 in such a configuration may create a divide, gap, or channel 120 between the bearings 124, 126, as displayed in FIG. 1 and discussed further herein. In other aspects, the cylindrical body 112 can be formed from a single solid roller.

Auxiliary roller(s) 110 as disclosed herein comprise a diameter 119. Such diameter 119 can be chosen based on a variety of needs for many manufacturing processes. As a non-limiting example, a diameter 119 includes any diameter 119 of a roller 110 capable of being received within the system 100, as shown in FIG. 1. In such an example, a diameter 119 includes a range from about one inch up to about six inches. In further examples, a diameter 119 may range from about two inches up to about five inches and about three inches up to about four inches. Other, non-disclosed ranges are also capable of being used with an auxiliary roller system 100.

In an aspect, an auxiliary roller system 100 is configured to have one or more auxiliary rollers 110. In such an aspect, a system 100 may have one, two, three, four, five, or more auxiliary rollers 110. Each number of rollers 110 may provide distinct advantages. As a non-limiting example, one auxiliary roller 110 may be used if only one side of a roller head 50 is leaking air, which may lead to disproportionate material loss or laps on that side. In such an example, one auxiliary roller 110 can be positioned on the problematic side (i.e., the side that is leaking air) to prevent leaking-associated issues disclosed herein. As an additional, non-limiting example, two auxiliary rollers 110 may be configured to prevent material loss or lapping occurring on both sides of a roller head 50. In such an example, one auxiliary roller 110 may be positioned on a first edge of an upper belt 30 while a second auxiliary roller 110 is positioned on a second, opposing edge of the upper belt 30 to prevent air or material leaking simultaneously on both edges. In some aspects, one or more roller head(s) 50 will be positioned on edges of a belt 40 to properly marry the counterband 30 to the belt 40, as further described herein.

An auxiliary roller 110 can be made of various materials, including, but not limited to, steel, stainless steel, steel alloys, and other durable materials resistant to heat and moisture. In most instances, the auxiliary roller 110 and other various components of the auxiliary roller system 100 should be configured to be durable and withstand exposure to a number of various embodiments. For example, in instances in which a material 80 must be exposed to high temperatures within a BFM 10 (e.g., PET with exposure to 290° F.), the components of an auxiliary roller system 100, including but not limited to the material of an auxiliary roller 110, would need to be able to withstand such temperatures. Materials of various components of auxiliary roller systems 100 described herein may be selected to achieve corrosion resistance, moisture resistance, acid resistance, and the like, depending on desired applications.

The outer surface 118 of a roller 110 is configured to engage a top surface 32 of an upper belt 30. In an aspect, the outer surface 118 can include a channel 120. A channel 120 may assist in securely engaging a counterband 30, as discussed below. In other aspects, a channel 120 may not serve a specific purpose. In one aspect, a channel 120 separates two bearings 124, 126 that form a cylindrical body 112 of an auxiliary roller 110, as shown in FIG. 1.

A cylindrical body 112, whether a single solid element or including bearings 124, 126, of an auxiliary roller 110 is configured to roll freely as the outer surface 118 of the auxiliary roller 110 engages a top surface 32 of an upper belt 30. In an aspect, the auxiliary roller 110 rolls freely while mounted on an axle 132. In such aspects, an aperture 130 extends from the first end 114 of an auxiliary roller 110 through the cylindrical body 112 and out of the second end 116 of the auxiliary roller 110. The aperture 130 is configured to receive the axle 132. In aspects in which two separate bearings 124, 126 are utilized to form a cylindrical body 112, apertures 130a, 130b of bearings 124, 126, respectively can be aligned such that an axle 132 is capable of extending through both apertures 130a, 130b simultaneously. In such aspects, apertures 130a, 130b may be concentric. Further in such aspects, apertures 130a, 130b may include similar, if not identical, shapes found in the bearings 124, 126. Fasteners 134 can be used to retain an auxiliary roller 110 on an axle 132. In such an aspect, fasteners 134 include, but are not limited to, locking or fastener nuts, washers, and other known fastening means configured to maintain a rotating cylindrical body 112 on an axle 132. The axle 132 is connected to an arm 140, as discussed below.

In an aspect, an aperture 130 of an auxiliary roller 110 includes a size or diameter configured to allow rotation of the auxiliary roller 110 around the axle 132. Fasteners 134 are positioned on the axle 132 as to keep the auxiliary roller 110 in a selected position along the length of the axle 132 while allowing rotation. In such an aspect, an auxiliary roller 110 will not travel along the axle 132 while rotating but also will not be so constrained as to hinder rotation of the auxiliary roller 110. In other embodiments, the aperture 130, axle 132, fasteners 134, and the arm 140 can be connected to one another in various means. In all aspects and embodiments, the auxiliary roller 110 is mounted so as to freely rotate. For example, the axle 132 may be fixedly mounted to an interior surface of an aperture 130 of an auxiliary roller 110 while the auxiliary roller 110 freely rotates around the axle, such as with an embodiment including a stationary aperture surface and a rotating roller disposed around the stationary surface. Such an aspect may eliminate need for fasteners 134 of a roller 110. In additional aspects, an axle 132 can be configured to rotate with the auxiliary roller 110 where the axle 132 and roller 110 would be joined in a fixed relationship. In such an aspect, the axle 132 would need to be mounted to the arm 140 so that the axle 132 could rotate with relation to the stationary arm 132.

As discussed above, the auxiliary roller 110 is connected to an arm 140. In an aspect, the auxiliary roller 110 is connected to the arm 140 at a roller end 142. In an aspect, the roller end 142 includes an axle aperture 144 configured to receive the axle 132. Axle fasteners 146 can be utilized to connect the axle 132 to the roller end 142 of the arm 140. An axle 132 can be fastened to an arm 140 in a fixed (i.e., both axle 132 and arm 140 do not rotate) or rotational (i.e., axle 132 rotates while arm 140 is stationary) capacity. In an aspect, an axle 132 can include a threaded surface (not shown) that can receive a bolt 146 to retain the axle 132 within the axle aperture 144. The arm 140 can include a mount end 150 opposite the roller end 142. The mount end 150 of the arm 140 is configured to engage or be coupled to a mount 170. In an aspect, the mount end 150 can include an adjustable securing device 152 configured to engage the mount 170, discussed below.

As shown in FIG. 1, the mount 170 can be a horizontal member 170 attached to a head roller mount 60 of the BFM 10. In an aspect, the horizontal member 170 can be removably attached to the head roller mount 60. In other aspects, the mount 170 can take various other forms that is attachable to various portions of the BFM 10, as discussed below.

In an aspect, the adjustable securing device 152 of the mount end 150 can include an aperture 154 that receives the horizontal member 172 of the mount 170. The adjustable securing device 152 can include a tightening fastener 156 that extends from an exterior of the adjustable securing device 152 into the aperture 154 to adjustably engage the surface of the horizontal member 170. The relationship of the adjustable securing device 152, the aperture 154, the tightening fastener 156, and the mount 170 allows the position of the arm 140 to be adjusted in relation to the mount 170 in various ways. For example, the arm 140 can be rotated around the mount 170, as well as transversely positioned along a length of the horizontal member 170. The ability to move the arm 140, and therefore the auxiliary roller 110, in such a fashion allows a user to customize the position of a roller 110 in various manners to accomplish desired goals for a variety of processes and applications.

Figure 4:
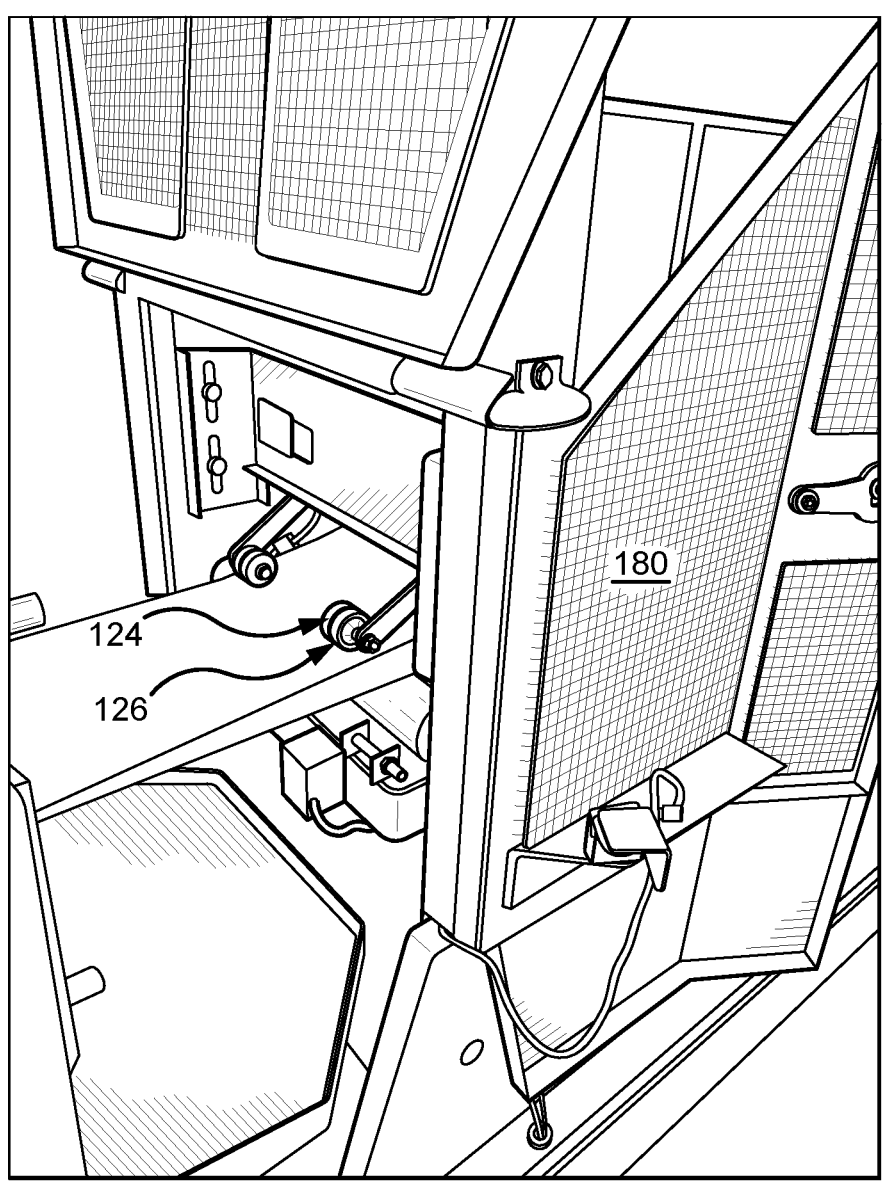
FIG. 4 shows an auxiliary roller system with an open head guard and auxiliary rollers according to an aspect of the present disclosure.
Figure 5:
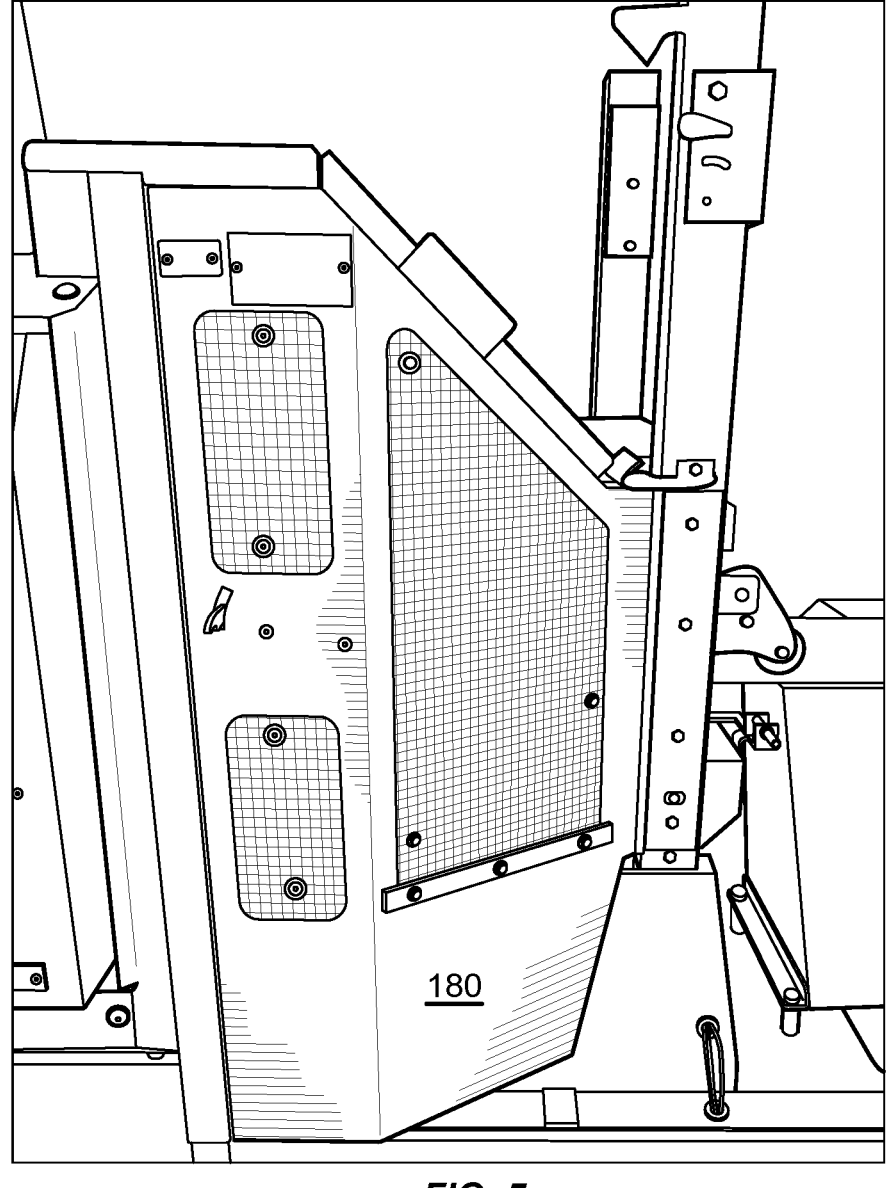
FIG. 5 displays side view of an aspect of an auxiliary roller system with a closed head guard according to an aspect of the present disclosure.

As discussed above, an auxiliary roller system 100 is configured to place an auxiliary roller 110 beyond a primary/head roller 50 of a BFM 10 and closer to or within an opening 20 or tunnel 70. The auxiliary roller system 100 can be connected to the BFM 10 via the mount 170 and adjustable securing device 152 of the arm 140. Once initially mounted, the auxiliary roller 110 can then be positioned at a lower position than the primary roller 50 relative to a lower belt 40 so that the auxiliary roller 110 can engage the top surface 32 of the upper belt/counterband 30 and marry the upper belt 30 to the lower belt 40. The auxiliary roller 110 can be positioned to the desired height relative to the lower belt 40 necessary to place the counterband 30 within the wanted distance of the lower belt 40 to ensure the marrying of the two belts 30/40 to retain materials 80. This can be done through rotationally adjusting the arm 140 with respect to a horizontal member 172 of a mount 170, via the adjustable securing device 152, until a desired height is reached. In addition, an arm 140 can be transversely positioned along the length of a horizontal member 172 of a mount 170 so that the surface 118 of the auxiliary roller 110 engages at least a portion of the top surface 32 of the upper belt 30. In an aspect, the auxiliary roller 110 is positioned just inside of a head guard 180 of a BFM 10, as shown in FIGS. 4-5. Such positioning of an auxiliary roller 110 reduces potential pinch points. Pinch points refer to positions where an operator may trap his or her extremity in a BFM 10, such as where two components of a BFM 10 operate in close proximity to each other. As such, a method for increasing operator safety is provided. Once an auxiliary roller 110 is positioned in a desired position, a tightening fastener 156 can be positioned to fully engage a horizontal member 172 of a mount 170 to secure the arm 140 in its horizontal and rotational positions relative to the horizontal member 172. Once secured, the BFM 10 can be activated to start feeding belts 30, 40 through the opening/head 20 and into the tunnel 70 at a desired speed.

In some aspects, an auxiliary roller system 100 is configured to be a free moving system. That is, an auxiliary roller system 100 does not provide power to auxiliary roller(s) 110 to cause auxiliary roller(s) 110 to rotate. In such aspects, auxiliary roller(s) 110 rely on movement of an upper belt/counterband 30, which may be driven by a primary/head roller 30 powered by a motor or any appropriate source of energy. Further, in an example aspect of the present disclosure, two auxiliary roller systems 100 may be configured to be used with a BFM 10. In such instances, two auxiliary roller systems 100 are set up such that the auxiliary rollers 110 are placed opposite one another over a width 36 of an upper belt 30. In one such aspect, auxiliary rollers 110 are oriented along edges 38 of the belt 30. Here, the channel 120 of the auxiliary rollers 110 provides a separation of two bearings 124, 126 to be used as rollers 110. Bearings 124, 126 may include a variety of bearings known in the art including but not limited to friction bearings, ball bearings, angular contact ball bearings, rolling element bearings, deep groove ball bearings, and any freely rotating bearing capable of contacting and supplying a downward force on an upper belt 30. Bearings 124, 126 may serve as an auxiliary roller 110 and freely rotate as the top surface 32 of an upper belt 30 moves underneath auxiliary roller 110.

In other aspects, various numbers of auxiliary roller systems 100 can be placed at various locations along the head/opening 20 and tunnel 70 of the BFM 10. Additional auxiliary roller systems 100 may be used to strategically maintain contact between an upper belt 30 and a lower belt 40 as material 80 moves through a BFM 10. As a non-limiting example, auxiliary roller systems 100 can be placed near heads/openings 20, further within the tunnel 70, and close to exits (not shown) of a BFM 10. Use of auxiliary rollers 110 further within the tunnel 70 and at exit head locations may provide an additional decrease in material loss and lapping, thus further decreasing downtime and increasing material throughput.

As discussed above, an auxiliary roller system 100 provides several advantages for processes using a BFM 10, as well as the BFM 10 itself. An auxiliary roller system 100 brings down an upper belt/counterband 30 at a position closer to or at an opening 20 of a BFM 10 when compared to traditional BFMs 10. This marries an upper belt 30 to a lower belt 40 sooner than in traditional processes and machines to keep one or more materials 80 being moved between the two belts 30, 40 from being blown off. This prevents the loss of material 80 and reduces entry head roller laps. As discussed above, roller laps occur when a feed material 80 separates from a lower belt 40 and wraps around one or more components of a roller head including but not limited to a primary roller 50. In such an aspect, roller laps lead to a number of problems including roller material being cut, the expansion of the diameter of a primary roller 50, which may force the roller head open, and the like. Roller laps additionally cause potential damage to one or more head components, which decreases component lifespans.

As a non-limiting example, a auxiliary roller system 100 can reduce the need for rebuilds of main roller components by decreasing material lapping and increasing roller head lifespans for periods of about one month and longer, depending on operating conditions. Operating conditions include throughput of feed materials (e.g., speed, amount, and the like), characteristics of feed materials (e.g., roughness), and the like, which may increase or decrease wear on roller head components. The increased lifespan leads to less downtime for replacement and repairs. In addition, an auxiliary roller system 100 allows adjustment to the overall speed of the belts. As a non-limiting example, the likelihood of roller laps and material loss is decreased by use of an auxiliary roller system 100. The decreased likelihood of materials 80 falling off of lower belts 40 allows for throughput speeds of feed materials 80 to be increased. By quickening material 80 transfer, overall rates of production can be increased.

Although several aspects have been disclosed in the foregoing specification, it is understood by those skilled in the art that many modifications and other aspects will come to mind to which this disclosure pertains, having the benefit of the teaching presented in the foregoing description and associated drawings. It is thus understood that the disclosure is not limited to the specific aspects disclosed hereinabove, and that many modifications and other aspects are intended to be included within the scope of any claims that can recite the disclosed subject matter.

It should be emphasized that the above-described aspects are merely possible examples of implementations, merely set forth for a clear understanding of the principles of the present disclosure. Many variations and modifications can be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. An auxiliary roller system configured to be used with a belt-feed machine, the auxiliary roller system comprising:
   a. an auxiliary roller;
   b. an arm comprising:
      i. a first end coupled to the auxiliary roller; and
      ii. a second end opposite the first end, wherein the second end includes an adjustable securing device;
   c. an adjustable mount comprising a horizontal support member, the adjustable mount coupled to the belt-feed machine and configured to connect to the arm via the adjustable securing device at the second end, wherein the adjustable securing device is configured to fix the arm in a selected rotational and transverse position on the adjustable mount, the adjustable mount in combination with the adjustable securing device positioning the auxiliary roller past a primary roller of the belt-feed machine, wherein the auxiliary roller is configured to engage and apply force to an upper belt of the belt-feed machine, and wherein the upper belt holds down material being fed into an opening of the belt-feed machine.

2. The auxiliary roller system of claim 1, wherein an outer surface of the auxiliary roller marries the upper belt to a lower belt to prevent raw material being fed into the machine from being blown off or falling off of the lower belt.

3. The auxiliary roller system of claim 2, wherein the outer surface of the auxiliary roller comprises a channel configured to engage an edge of the upper belt.

4. The auxiliary roller system of claim 1, wherein the auxiliary roller comprises two bearings separated by a channel, and wherein the auxiliary roller comprising two bearings is configured to rotate freely.

5. The auxiliary roller system of claim 1, further comprising an axle coupled to the auxiliary roller, wherein the axle extends the auxiliary roller away from the arm.

6. The auxiliary roller system of claim 5, wherein the auxiliary roller further comprises an aperture to receive the axle.

7. The auxiliary roller system of claim 6, wherein the auxiliary roller is configured to rotate around the axle, and the axle is coupled in a fixed relationship to the arm.

8. The auxiliary roller system of claim 6, further comprising fasteners to securely mount the auxiliary roller on the axle while allowing the auxiliary roller to freely rotate around the axle.

9. The auxiliary roller system of claim 1, wherein the auxiliary roller system comprises a first auxiliary roller system and a second auxiliary roller system, wherein the first and second auxiliary roller systems are configured to engage opposite edges across a width of the upper belt via a first auxiliary roller and a second auxiliary roller.

10. The auxiliary roller system of claim 1, wherein the auxiliary roller system is configured for use with belt-feed machines used for yarn processing.

11. The auxiliary roller system of claim 1, wherein the auxiliary roller rotates freely.

12. The auxiliary roller system of claim 1, wherein the auxiliary roller includes a cylindrical body.

13. The auxiliary roller of claim 1, wherein the adjustable mount comprises an aperture configured to receive the horizontal support member, wherein the horizontal support member is configured to attach adjacent the opening of the belt-feed machine.

14. The auxiliary roller of claim 1, wherein the mount allows the arm and the auxiliary roller to be adjustably mounted at different positions in relation to the mount.

15. A system for feeding a material into a machine, the system comprising:
   a. an opening of the machine configured to receive a feed of the material;
   b. a lower belt configured to carry and move the feed through the opening and into the machine;
   c. an upper belt disposed above the lower belt and configured to retain the feed on the lower belt while the upper belt and the lower belt move through the machine;
   d. a primary roller disposed outside of the opening and configured to substantially contact a width of the upper belt to allow the upper belt to enter the opening and create a force needed to retain the feed on the lower belt;
   e. an adjustable mount including a horizontal support member attached to the machine near the opening and behind the primary roller; and
   f. a first auxiliary roller first auxiliary roller system positioned further within the opening of the machine, wherein the first auxiliary roller comprises:
      i. an auxiliary roller;
      ii. an arm having:
         1. a first end coupled to the auxiliary roller; and
         2. a second end opposite the first end, wherein the second end includes an aperture and an adjustable securing device;
   wherein the first auxiliary roller system is connected to the adjustable mount via the aperture of the second end of the arm and the adjustable securing device, wherein the adjustable securing device is configured to fix the arm in a selected rotational and transverse position on the adjustable mount, and wherein the auxiliary roller is in contact with the upper belt and applies an additional force to keep the feed between the upper belt and the lower belt.

16. The system of claim 15, wherein the system comprises a second auxiliary roller system, and wherein the first auxiliary roller system and the second auxiliary roller system are disposed on opposing ends of the width of the upper belt.

17. The system of claim 16, wherein the first and second auxiliary roller systems prevent the material being fed into the machine from being blown back out of the opening or falling off of the lower belt.

18. The system of claim 17, wherein both the first and second auxiliary roller systems are coupled to the machine through first and second adjustable mounts connected to first and second arms.

19. The system of claim 18, wherein the horizontal support member is disposed outside of a tunnel of the machine.

20. The system of claim 19, wherein the machine comprises a yarn producing machine, and wherein the material fed into the machine is a raw material for producing yarn.

\* \* \* \* \*